(12) United States Patent
Stephenson et al.

(10) Patent No.: US 7,584,888 B2
(45) Date of Patent: Sep. 8, 2009

(54) ITEM TAG WITH LIQUID CRYSTAL DISPLAY AND IMAGE

(75) Inventors: Stanley W Stephenson, Spencerport, NY (US); James M. Papa, Rochester, NY (US); Dennis B. Schulmerich, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 909 days.

(21) Appl. No.: 10/162,326

(22) Filed: Jun. 4, 2002

(65) Prior Publication Data

US 2003/0222139 A1  Dec. 4, 2003

(51) Int. Cl.
G09F 3/20 (2006.01)
G06K 15/00 (2006.01)
G06K 19/00 (2006.01)

(52) U.S. Cl. .................. 235/383; 235/487; 40/299.01; 40/5; 40/446

(58) Field of Classification Search .......... 235/383, 235/385, 375; 705/20, 22; 700/225; 40/299.01, 40/5, 446
See application file for complete search history.

(56) References Cited

U.S. PATENT DOCUMENTS

| | | | |
|---|---|---|---|
| 3,600,060 A | 8/1971 | Churchill et al. | |
| 4,435,047 A | 3/1984 | Fergason | |
| 4,888,709 A * | 12/1989 | Revesz et al. | 358/1.15 |
| 5,111,196 A * | 5/1992 | Hunt | 340/5.91 |
| 5,382,779 A * | 1/1995 | Gupta | 235/383 |
| 5,557,096 A * | 9/1996 | Watanabe et al. | 235/492 |
| 5,584,362 A * | 12/1996 | Dumont | 186/61 |
| 5,587,703 A * | 12/1996 | Dumont | 340/568.2 |
| 5,619,416 A * | 4/1997 | Kosarew | 700/225 |
| 5,751,257 A * | 5/1998 | Sutherland | 345/1.2 |
| 6,269,342 B1 * | 7/2001 | Brick et al. | 705/20 |
| 6,307,919 B1 * | 10/2001 | Yoked | 235/385 |
| 6,637,650 B1 * | 10/2003 | Capurso et al. | 235/383 |
| 6,801,175 B2 * | 10/2004 | Miyamoto et al. | 345/84 |
| 7,114,864 B2 * | 10/2006 | Shimoda et al. | 400/76 |
| 7,167,167 B2 * | 1/2007 | Capurso et al. | 345/204 |
| 2002/0086798 A1 * | 7/2002 | Tamura et al. | 503/218 |

OTHER PUBLICATIONS

U.S. Appl. No. 10/134,185, filed Apr. 29, 2002 by Stephenson et al.

* cited by examiner

Primary Examiner—Jamara A Franklin
(74) Attorney, Agent, or Firm—Alston & Bird LLP

(57) ABSTRACT

A tag for an item includes a support having a printable area; a writable display attached to the support, the writable display including a layer of material for displaying information relating to the item, and an image of the item printed on the printable area.

39 Claims, 4 Drawing Sheets ated to an item or to a shelf near a collection of items Item tags are typically printed with inks using thermal, impact or inkjet processes. Such printing creates an unchanging display of a price Electronic Shelf Labels (ESL) from IBM, National Cash Register and Fujitsu provide glass liquid crystal displays to present pricing information that can be electronically updated. Commercial Electronic Shelf Labels use conventional TN displays that require continuous electronic refreshing to display data The continuous refreshing requires refreshing electronics and a battery Printed labels are attached to a rigid substrate of the ESL to provide a display of unchanging universal product code (UPC) and product description. Current ESLs update pricing information using radio waves or light to transmit updated pricing information to a specific label.

ITEM TAG WITH LIQUID CRYSTAL DISPLAY AND IMAGE

FIELD OF THE INVENTION

The present invention relates to an item tag having printed information about an item, and a liquid crystal display for displaying information about the item.

BACKGROUND OF THE INVENTION

Currently, pricing of items is shown by item tags attached to an item or to a shelf near a collection of items Item tags are typically printed with inks using thermal, impact or inkjet processes. Such printing creates an unchanging display of a price Electronic Shelf Labels (ESL) from IBM, National Cash Register and Fujitsu provide glass liquid crystal displays to present pricing information that can be electronically updated. Commercial Electronic Shelf Labels use conventional TN displays that require continuous electronic refreshing to display data The continuous refreshing requires refreshing electronics and a battery Printed labels are attached to a rigid substrate of the ESL to provide a display of unchanging universal product code (UPC) and product description. Current ESLs update pricing information using radio waves or light to transmit updated pricing information to a specific label.

Media systems exist that maintain electronically changeable data without power. Such system can be electrophoretic (Eink), gyricon or polymer dispersed cholesteric materials. An example of electronically updateable display can be found in U.S. Pat. No. 3,600,060 issued Aug. 17, 1971 to Churchill et al. that shows a device having a coated then dried emulsion of cholesteric liquid crystals in aqueous gelatin to form a field responsive, bistable display.

Fabrication of flexible, electronically written display sheets is disclosed in U.S. Pat. No. 4,435,047 issued Mar. 6, 1984 to Fergason. A first sheet has transparent ITO conductive areas and a second sheet has electrically conductive inks printed on display areas The sheets can be glass, but in practice have been formed of Mylar polyester. A dispersion of liquid crystal material in a binder is coated on the first sheet, and the second sheet is pressed onto the liquid crystal material. Electrical potential applied to opposing conductive areas operates on the liquid crystal material to expose display areas. The display ceases to present an image when de-energized.

U.S. Pat. No. 5,751,257 issued May 12, 1998 to Sutherland discloses an electronic shelf label using a display that has first and second rigid substrates, with the bottom substrate protruding beyond the top substrate to provide access to conductors on the bottom substrate Cholesteric material in the proposed display provides pricing information that does not require refresh electronic or a power source Connection to a common conductor on the top substrate is provided by an extension arm having an electrical contact that makes contact with the conductor on the underside of top substrate Segments of the display are updated by rolling a second contact across sequentially arrayed contacts on the bottom substrate.

Stores update pricing of items frequently. Printed tags must be continually replaced to provide updated information. Electronic tags are expensive, and currently are built into rigid assemblies. It would be useful to have an image of the item printed onto an item tag. Unfortunately, image printing is expensive for disposable tags. Electronically re-writable displays cannot be passed through conventional printing systems such as inexpensive ink jet printers.

There is a need therefore for an inexpensive display structure that can be electronically re-written and receive a printed image of the item for sale. It is of further utility that the tag be flexible to pass through conventional ink jet printers

SUMMARY OF THE INVENTION

The need is met according to the present invention by a tag for an item that includes a support having a printable area, a writable display attached to the support, the writable display including a layer of material for displaying information relating to the item, and an image of the item printed on the printable area.

ADVANTAGES

The addition of item image on the item tag of the present invention improves the accuracy of pricing information by visually identifying an item's price with the item.

DETAILED DESCRIPTION OF THE INVENTION

Figure 1:
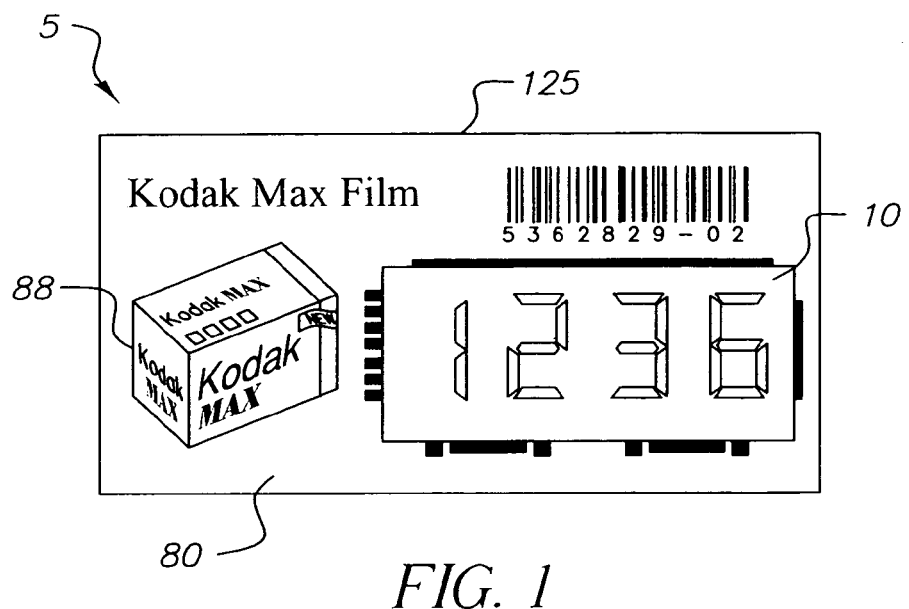
FIG. 1 is a top view of an item tag in accordance with the present invention having writable pricing information and a printed image of an item.

FIG. 1 shows a top view of an item tag 5 according to the present invention. Item tag 5 can include printed description data 125 such as an item description, a universal product code (UPC) and UPC bar code printed on a printable support 80. The item tag 5 can be attached to a sale item, or be presented near a grouping of common sales items as for example, a shelf tag. Writable numeric information is displayed on an electronically writable display 10 attached to a printable support 80. Display 10 can be configured to display price information, quantity information or time information about item 87 (see FIG. 2). Alternatively, display 10 can show the number of items in a set, such as number of parts remaining in a container, or the expiration date of the common items in a container.

In a preferred embodiment of the invention, the item tag 5 is a flexible tag of the type described in U.S. Ser. No. 10/134, 185, filed Apr. 29, 2002 by Stephenson et al. Such flexible tags permit pricing information to be updated with respect to unchanging description data 125. The flexible item tag 5 can be passed through a standard printer, such as an ink jet printer to print description data 125. In accordance with the present invention, the item tag 5 further includes an item image 88 of an item 87 (see FIG. 2). A datawriter 115 can be used to update display 10.

Figure 2:
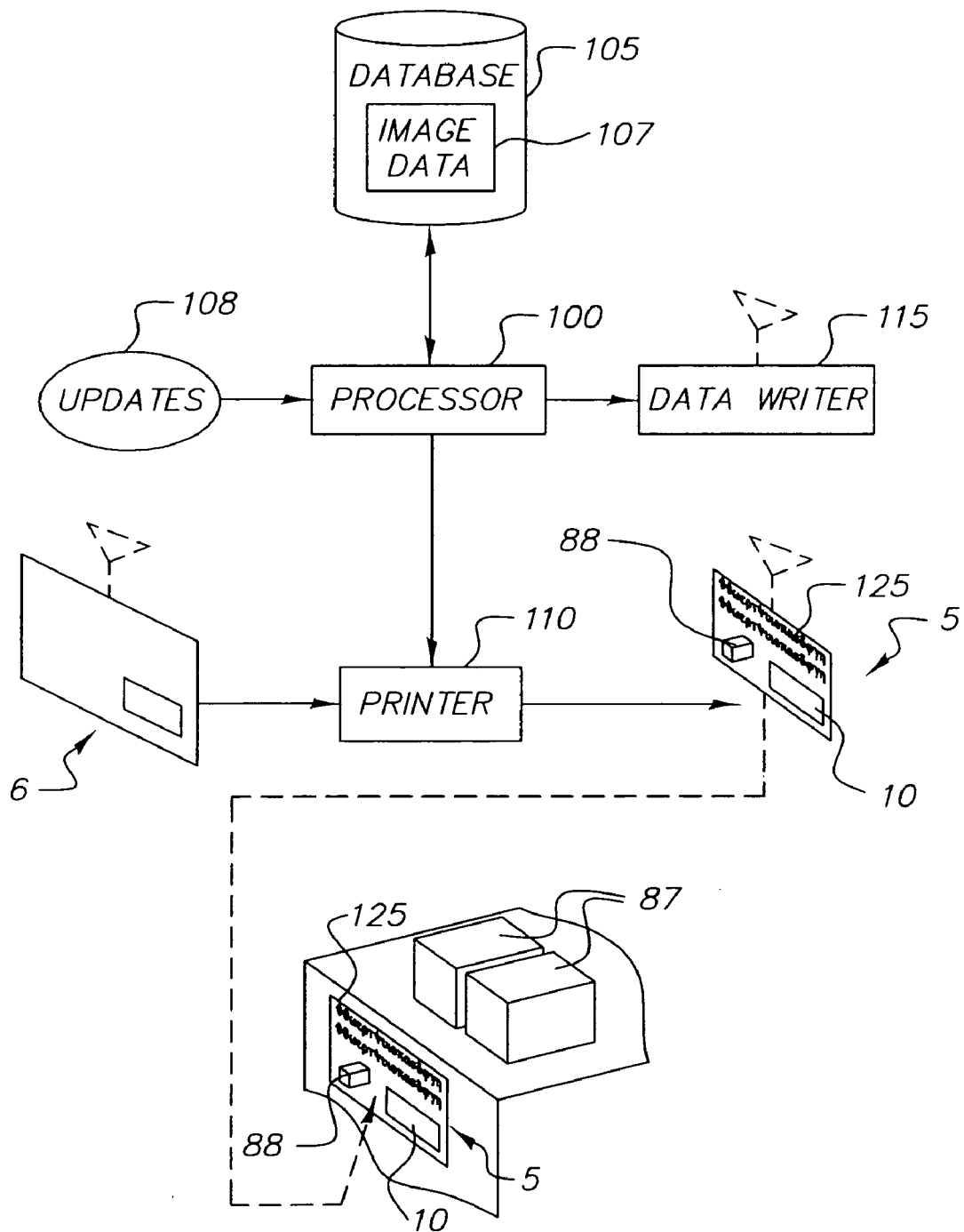
FIG. 2 is a schematic diagram of a system to provide an item tag according to the present invention.

FIG. 2 is a schematic of a system to provide a item tag having electronically updated pricing information and an image of the sale item. Unchanging description data 125 and item image 88 is printed on an unprinted item tag 6 using a conventional ink jet or thermal printer 110 to produce item tag 5.

Figure 3:
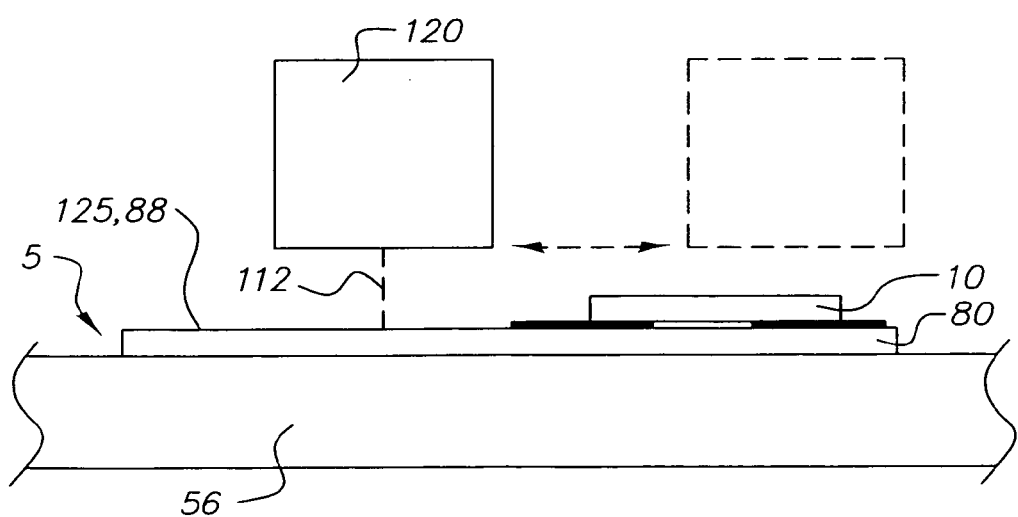
FIG. 3 is a schematic side view of a printer for printing a item tag in accordance with the present invention.

FIG. 3 shows an ink jet print head 120 printing an item tag 5. A plurality of item tags 5 can be attached to a release liner 56 in a way that permits item tags 5 to be removed from release liner 56 after printing. The ink jet print head 120 is spaced a conventional distance, approximately 1 millimeter, from the printable support 80 to print description data 125 and item image 88 using ink droplets 112. Display 10 is approximately 0.25 millimeters in thickness, and does not obstruct the motion of ink jet print head 120 as the head traverses over display 10. Display 10 and printable support 80 are thin enough to flexibly pass through a conventional inkjet printer which typically has a media path that requires the media to bend.

Figure 4A:
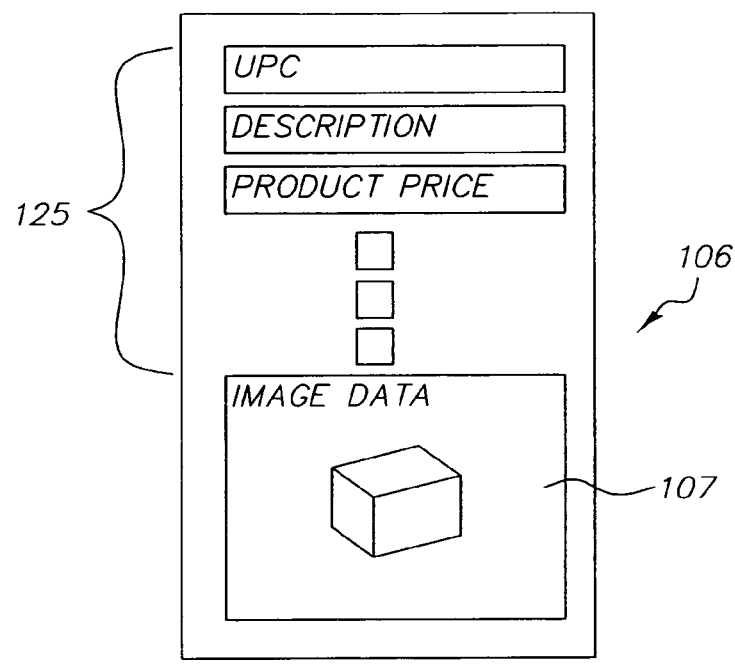
FIG. 4A is a diagram representing a data set for an item in the system of FIG. 2.
Figure 4B:
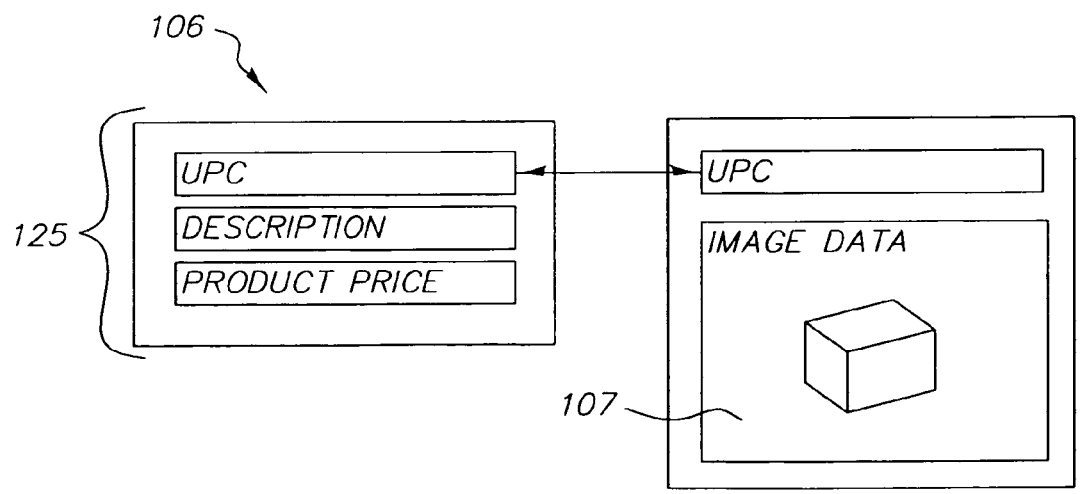
FIG. 4B is diagram representing an alternative data set for an item in the system of FIG. 2.

Returning to FIG. 2, a processor 100 accesses data from a database 105, which contains information about the items 87. According to the present invention, database 105 includes image data 107 representing items 87. FIG. 4a shows a data set 106 for a sale item in the system of FIG. 2. The data set 106 includes description data 125 consisting of a Universal Product Code (UPC), a product description, a price, and image data 107 that can be used to print an image of an item 87 Image data 107 can be conventional image file types, such as a *.jpg or * tiff file type The image data can represent either black and white, or color images FIG. 4b is an alternative dataset for an item 87 in the system of FIG. 2. Two separate records are created, a first record having the descriptive data 125 for an item including the UPC, and a second file containing image data 107 that is indexed to descriptive data 125 using the UPC Processor 100 accesses both records using the common UPC to generate a item tag 5 with both descriptive data 125 and an item image 88.

Returning to FIG. 2, processor 100 operates on data from database 105 to supply printing instructions to printer 110 having a print head 120 to print on unprinted item tag 6 both descriptive data 125 and an item image 88 to create a item tag 5 for an item 87. Item tag 5 can be directly attached to an item 87 or be presented on a shelf adjacent to one or more items 87 that may be stacked on the shelf or stored in a bin (not shown).

Often, many types of items are presented in close adjacency. The addition of item image 88 on item tag 5 improves the accuracy of pricing information by providing visual confirmation that data on display 10 is for a given item 87 The cost of replacing item tags 5 when pricing information is updated is eliminated when item tags 5 includes electronically updateable information in electrically writable display 10

Datawriter 115 is incorporated into the system of FIG. 2. In one embodiment, datawriter 115 is selectively connected to processor 100 to receive update information 108 from processor 100 for certain articles 87. Processor 100 accesses database 105, and transmits updated display information to datawriter 115 Datawriter 115 can be a portable data terminal that is pressed against each item tag 5 to update information on display 10.

Figure 5:
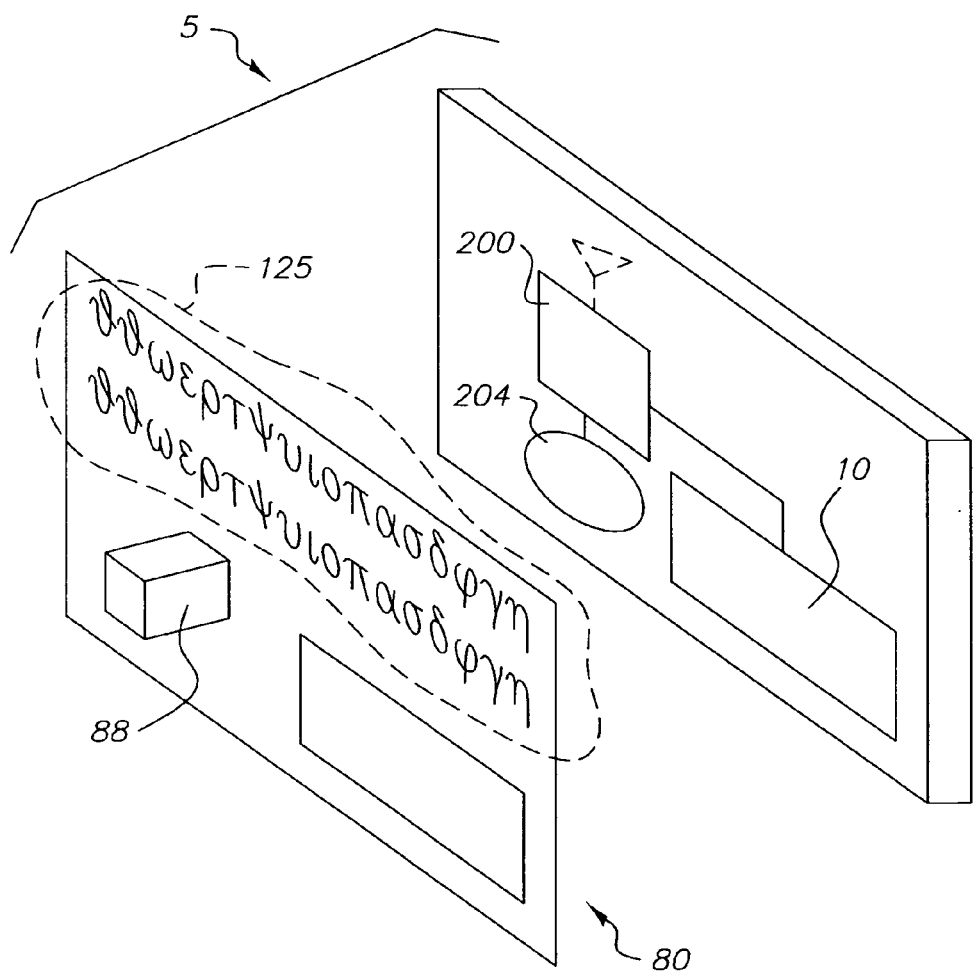
FIG. 5 is an exploded perspective view of an item tag in accordance with the present invention.

FIG. 5 is an exploded schematic view of an item tag 5 in accordance with another embodiment of the current invention. In this embodiment, display 10 is a conventional twisted-nematic display cell that requires periodic electronic updates to maintain an image on display 10. Item tag 5 includes tag electronics 200 that are powered by a power supply 204. Power supply 204 continuously powers item tag 5 and can be a battery or a solar cell connected to tag electronics 200 for updating the display 10.

Display 10 is preferably a cholesteric liquid crystal display that maintains an image in the absence of an electric field generated in a single write process by tag electronics 200 The use of a cholesteric liquid crystal display in this embodiment reduces power demand on power supply 204. In this embodiment, printable support 80 is a flexible label printed by a conventional printer 110 and has an item image 88. Printable support 80 is attached to the front of item tag 5. The addition of item image 88 improves the accuracy of pricing information by providing visual confirmation that data on display 10 is for a given item 87

Alternatively, datawriter 115 can be a transmitter that broadcasts update information to tag electronics 200 to update display 10 using radio waves, visible light or infrared light In this application, item tag 5 may be of rigid construction, with a printable area to display item image 88 Item image 88 can be applied to item tag 5 using ink jet components disposed to imprint image item 88 onto a printable support 80 that is attached to the front of item label 5. The addition of item image 88 improves the accuracy of pricing information by providing visual confirmation that data on display 10 is for a given item 87.

The invention has been described in detail with particular reference to certain preferred embodiments thereof, but it will be understood that variations and modifications can be effected within the spirit and scope of the invention.

PARTS LIST 5 item tag
6 unprinted item tag
10 display
56 release liner
80 printable support
87 item
88 item image
100 processor
105 database
106 data set
107 image data
108 update information
110 printer
112 ink droplets
115 datawriter
120 ink jet head
125 description data
200 tag electronics
204 power supply

What is claimed is:

1. A flexible tag for an item, comprising:
  a) a flexible support having a printable area;
  b) an electronically re-writeable, updateable display attached to said flexible support, said electronically re-writeable, updateable display including a layer of material for displaying updateable information relating to said item; and
  c) an image of said item printed on said printable area, wherein said tag comprising said flexible support having a printable area and said electronically re-writeable, updateable display attached to said flexible support is passed through a thermal or ink jet printer to print the image on said printable area of said flexible support of said tag.

2. The tag claimed in claim 1, wherein the printer is an ink jet printer.

3. The tag claimed in claim 1, wherein the tag is a shelf tag, and the information on the electronically re-writeable, updateable display is an item price.

4. The tag claimed in claim 1, wherein the tag is a sales tag and the information is a unit price.

5. The tag claimed in claim 1, wherein the tag is a container label and the updateable information is a quantity description.

6. The tag claimed in claim 1, wherein the tag is a container label and the updateable information is a time reference.

7. The tag claimed in claim 1, further comprising item descriptive information in the printable area.

8. The tag claimed in claim 1, further comprising a UPC, item description, or a combination thereof, printed on the printable area.

9. The tag claimed in claim 1, wherein the updateable information displayed is stable in the absence of an electrical field.

10. The tag claimed in claim 9, wherein the material is a polymer dispersed cholesteric liquid crystal material.

11. The tag claimed in claim 1, wherein the electronically re-writeable, updateable display is a re-writable using a thermal or optical technique.

12. A system for making item tags, comprising:
   a) a blank item tag having:
      i) a flexible support defining a printable area, and
      ii) an electronically re-writeable, updateable display attached to said flexible support, said electronically re-writeable, updateable display including a layer of material for displaying updateable information relating to the item;
   b) a database containing,
      i) an identification code for an item,
      ii) display data for displaying on said electronically re-writeable, updateable display, and
      iii) data representing an image of the item;
   c) a thermal or ink jet printer for printing the item image on said blank item tag, wherein said blank item tag having said flexible support defining a printing area and said electronically re-writeable, updateable display attached to said flexible support is passed through the printer to print said item image on said printable area of said blank item tag;
   d) a datawriter for electrically writing said display data on said electronically re-writeable, updateable display; and
   e) a processor connected to said database for retrieving and transmitting said image data to said printer and said display data to said datawriter.

13. The system claimed in claim 12, wherein the printer is an ink jet printer.

14. The system claimed in claim 12, wherein the tag is a shelf tag, and the information on the electronically re-writeable, updateable display is an item price.

15. The system claimed in claim 12, wherein the tag is a sales tag and the updateable information is a unit price.

16. The system claimed in claim 12, wherein the tag is a container label and the updateable information is a quantity description.

17. The system claimed in claim 12, wherein the tag is a container label and the updateable information is a time reference.

18. The system claimed in claim 12, further comprising item descriptive information in the printable area.

19. The system claimed in claim 12, wherein the datawriter includes a transmitter for transmitting the display data and the item tag includes a receiver, a driver and a power supply for writing the display data to the electronically re-writeable, updateable display.

20. The system claimed in claim 12, wherein the display data and the image data are stored in a data set.

21. The system claimed in claim 20, wherein the data set further includes a UPC, a product description, or both, and wherein the processor further transmits the UPC, product description, or both, to the printer for printing on the item tag.

22. The system claimed in claim 12, wherein the updateable information displayed is stable in the absence of an electrical field.

23. The system claimed in claim 22, wherein the material is a polymer dispersed cholesteric liquid crystal material.

24. The system claimed in claim 12, wherein the printer is a thermal printer.

25. The system claimed in claim 12, wherein the electronically re-writeable, updateable display is a re-writable using a thermal or optical technique.

26. A method for making item tags, comprising the steps of:
   a) providing a blank item tag having:
      i) a flexible support defining a printable area, and
      ii) an electronically re-writeable, updateable display attached to said flexible support, the electronically re-writeable, updateable display including a layer of material for displaying updateable information relating to the item;
   b) providing a database containing,
      i) an identification code for an item,
      ii) display data for displaying on the electronically re-writeable, updateable display, and
      iii) data representing an image of the item;
   c) providing a thermal or ink jet printer for printing the item image on said blank item tag;
   d) providing a datawriter for electrically writing said display data on said electronically re-writeable, updateable display;
   e) providing a processor connected to said database;
   f) employing said processor to retrieve and transmit said data representing an image of the item to said printer and said display data to said datawriter;
   g) passing said blank item tag comprising said flexible support defining a printable area, and said electronically re-writeable, updateable display attached to said flexible support through said printer to print said item image on said blank item tag; and
   h) using said datawriter to write said display data on said electronically re-writeable, updateable display.

27. The method claimed in claim 26, wherein the printer is an ink jet printer.

28. The method claimed in claim 26, wherein the tag is a shelf tag, and the updateable information on the display is an item price.

29. The method claimed in claim 26, wherein the tag is a sales tag and the updateable information is a unit price.

30. The method claimed in claim 26, wherein the tag is a container label and the updateable information is a quantity description.

31. The method claimed in claim 26, wherein the tag is a container label and the updateable information is a time reference.

32. The method claimed in claim 26, further comprising item descriptive information in the printable area.

33. The method claimed in claim 26, wherein the datawriter includes a transmitter for transmitting the display data and the item tag includes a receiver, a driver and a power supply for writing the display data to the electronically re-writeable, updateable display.

34. The method claimed in claim 26, wherein the display data and the image data are stored in a data set.

35. The method claimed in claim 34, wherein the data set further includes a UPC, a product description, or a combination thereof, and wherein the processor further transmits the UPC, product description, or both, to the printer for printing on the item tag.

36. The method claimed in claim 26, wherein the updateable information displayed is stable in the absence of an electrical field.

37. The method claimed in claim 36, wherein the material is a polymer dispersed cholesteric liquid crystal material.

38. The method claimed in claim 26, wherein the printer is a thermal printer.

39. The method claimed in claim 26, wherein the electronically re-writeable, updateable display is a re-writable using a thermal or optical technique.

* * * * *